(12) United States Patent
Christoph

(10) Patent No.: US 8,473,189 B2
(45) Date of Patent: Jun. 25, 2013

(54) HELICOPTER HAVING COLLISION AVOIDANCE APPARATUS

(75) Inventor: Kessler Christoph, Braunschweig (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 192 days.

(21) Appl. No.: 13/121,502

(22) PCT Filed: Aug. 31, 2009

(86) PCT No.: PCT/DE2009/001219
§ 371 (c)(1),
(2), (4) Date: Mar. 29, 2011

(87) PCT Pub. No.: WO2010/057451
PCT Pub. Date: May 27, 2010

(65) Prior Publication Data
US 2011/0178711 A1    Jul. 21, 2011

(30) Foreign Application Priority Data
Nov. 18, 2008  (DE) .......................... 10 2008 058 029

(51) Int. Cl.
*F41G 9/00* (2006.01)
*G06G 17/10* (2006.01)
*G06G 7/78* (2006.01)

(52) U.S. Cl.
USPC ..................... 701/302; 244/17.11; 244/17.13; 701/9; 701/112; 701/482; 701/519; 701/301

(58) Field of Classification Search
None
See application file for complete search history.

(56) References Cited

U.S. PATENT DOCUMENTS

| 3,417,729 A | | 12/1968 | Gilday et al. |
| 3,799,358 A | * | 3/1974 | Putnam .......................... 212/285 |
| 3,875,823 A | * | 4/1975 | Velasquez ................ 74/665 GB |
| 3,894,703 A | * | 7/1975 | Velasquez .................. 244/17.23 |
| 3,902,688 A | * | 9/1975 | Seibel et al. ................ 244/17.11 |
| 3,921,938 A | * | 11/1975 | Jupe et al. .................. 244/17.11 |

(Continued)

FOREIGN PATENT DOCUMENTS

| DE | 2549884 A1 | 9/1976 |
| DE | 3434758 A1 | 4/1986 |

(Continued)

OTHER PUBLICATIONS

English Translation International Search Report and Preliminary Report; PCT/DE2009/001219.

(Continued)

*Primary Examiner* — Thomas Tarcza
*Assistant Examiner* — Richard Goldman
(74) *Attorney, Agent, or Firm* — Hahn Loeser & Parks LLP

(57) ABSTRACT

The invention relates to a helicopter, comprising a tail jib (12), at least one distance sensor (16.1) attached to the tail jib (12) for capturing a distance (A) from an object (18) that may be present in a surrounding area of the tail jib (12), and an electric evaluation unit (20), which is connected to the distance sensors (16) and equipped to calculate a position of the object (18) relative to the helicopter (10). According to the invention, a collision avoidance apparatus is provided, which is designed to avoid a collision of a person with the tail jib (12).

9 Claims, 2 Drawing Sheets

U.S. PATENT DOCUMENTS

| | | | | |
|---|---|---|---|---|
| 4,090,567 A * | 5/1978 | Tomlinson | | 169/53 |
| 4,509,898 A * | 4/1985 | Gormer | | 416/2 |
| 4,768,737 A * | 9/1988 | Broadley | | 244/17.21 |
| 4,809,930 A * | 3/1989 | Ballerio et al. | | 244/17.11 |
| 4,809,931 A * | 3/1989 | Mouille et al. | | 244/17.21 |
| 4,887,087 A * | 12/1989 | Clearwater | | 342/61 |
| 4,928,907 A * | 5/1990 | Zuck | | 244/6 |
| 4,948,068 A * | 8/1990 | VanHorn | | 244/17.19 |
| 5,016,837 A * | 5/1991 | Willis | | 244/12.1 |
| 5,067,668 A * | 11/1991 | Zuck | | 244/7 R |
| 5,205,512 A * | 4/1993 | Rumberger | | 244/17.19 |
| 5,209,430 A * | 5/1993 | Wilson et al. | | 244/17.19 |
| 5,232,183 A * | 8/1993 | Rumberger | | 244/17.19 |
| 5,240,205 A * | 8/1993 | Allongue | | 244/17.19 |
| 5,251,847 A * | 10/1993 | Guimbal | | 244/17.19 |
| 5,269,654 A * | 12/1993 | Chapman | | 416/120 |
| 5,305,968 A * | 4/1994 | Arlton | | 244/17.13 |
| 5,371,581 A | 12/1994 | Wangler et al. | | |
| 5,377,934 A * | 1/1995 | Hill | | 244/17.11 |
| 5,381,692 A * | 1/1995 | Winslow et al. | | 73/593 |
| 5,407,386 A * | 4/1995 | Kish et al. | | 464/99 |
| 5,527,155 A * | 6/1996 | Chen et al. | | 416/226 |
| 5,566,907 A * | 10/1996 | Marze et al. | | 244/17.19 |
| 5,588,618 A * | 12/1996 | Marze et al. | | 244/17.19 |
| 5,597,138 A * | 1/1997 | Arlton et al. | | 244/17.13 |
| 5,607,122 A * | 3/1997 | Hicks et al. | | 244/17.19 |
| 5,634,611 A * | 6/1997 | Marze et al. | | 244/17.19 |
| 5,649,678 A * | 7/1997 | Nurick | | 244/17.19 |
| 5,672,112 A * | 9/1997 | Sbabo | | 464/157 |
| 5,676,335 A * | 10/1997 | Murgia et al. | | 244/17.19 |
| 5,691,391 A * | 11/1997 | Chen et al. | | 521/99 |
| 5,693,896 A * | 12/1997 | Mistral et al. | | 73/865.9 |
| 5,738,301 A * | 4/1998 | Francois et al. | | 244/17.19 |
| 5,775,637 A * | 7/1998 | Vuillet et al. | | 244/17.11 |
| 5,791,592 A * | 8/1998 | Nolan et al. | | 244/17.11 |
| 5,799,900 A * | 9/1998 | McDonnell | | 244/7 A |
| 6,002,349 A * | 12/1999 | Greene et al. | | 340/965 |
| 6,021,976 A * | 2/2000 | Exter | | 244/17.19 |
| 6,036,141 A * | 3/2000 | Clay | | 244/17.19 |
| 6,123,290 A * | 9/2000 | Lavergne et al. | | 244/17.11 |
| 6,176,679 B1 * | 1/2001 | Bietenhader | | 416/143 |
| 6,243,649 B1 * | 6/2001 | Wetherbee et al. | | 701/470 |
| 6,830,214 B2 * | 12/2004 | Carson | | 244/17.11 |
| 2004/0007645 A1 * | 1/2004 | Carson | | 244/17.25 |
| 2007/0001052 A1 * | 1/2007 | Strehlow et al. | | 244/99.1 |
| 2011/0178711 A1 * | 7/2011 | Christoph | | 701/301 |

FOREIGN PATENT DOCUMENTS

| | | |
|---|---|---|
| DE | 102007014878 A1 | 10/2008 |
| EP | 0139283 A1 | 12/1984 |
| GB | 2418652 A1 | 5/2006 |
| WO | 2008116456 A1 | 10/2008 |

OTHER PUBLICATIONS

International Search Report and Preliminary Report; PCT/DE2009/001219; Deutsches Für Luft- Und Raumfahrt e.V.

* cited by examiner

HELICOPTER HAVING COLLISION AVOIDANCE APPARATUS

The invention relates to a helicopter having a tail boom, at least one proximity sensor which is fitted to the tail boom, for detection of a distance to an object which is present approximately in the vicinity of the tail boom, and an electrical evaluation unit, which is connected to the proximity sensors and is designed to calculate a position of the object relative to the helicopter.

Helicopters such as these are known and are used in order to operate close to the ground or close to obstructions. They frequently have to land in unprepared terrain. This applies to both civil and military operations. After landing, people often move within the area around the helicopter, while the rotors are still rotating. This is the case, for example, when helicopters are intended to pick up a load, or place it down, quickly, for time reasons. In these situations, it is possible, particularly in the case of traditional helicopter configurations with a main rotor and a tail rotor, for the tail rotor or tail boom to make contact with objects such as trees, masts, etc. or even people. If the helicopter is still airborne in this case, the damage to the tail rotor, in particular, leads to a crash, because the pilot cannot compensate for the loss of the tail rotor sufficiently quickly by initiation of autorotation. This can result in very serious damage to the helicopter, when it strikes the ground. If the helicopter has landed and the tail rotor is still rotating, someone who is careless can suffer very severe injuries on contact with the tail rotor.

In known helicopters, cameras are known which indicate an image of the tail area to the pilot, on a small monitor. This has the disadvantage that the image is frequently displayed in a distorted form, as a result of which it is difficult for the pilot to correctly assess the situation around the tail boom.

DE 34 34 758 C2, EP 0 139 283, DT 25 49 884 A1, GB 2 418 652 A and U.S. Pat. No. 3,417,729 disclose landing aids for helicopters, in which the distance between the tail boom and the ground is continuously determined. If the distance falls below a predetermined value, then a signal is passed to the pilot, thus allowing autorotation to be ended in good time during a practice flight. However, the systems do not allow the pilot to identify a hazard to people caused by the tail rotor.

DE 10 2007 014 878 A1 discloses a system for omnidirectional collision warning for helicopters. The system is used to identify obstructions in flight, and thus to avoid collisions. Appropriate information is displayed to the pilot for this purpose. This system is also unsuitable for protection of people against accidents with tail rotors.

The invention is based on the object of providing better protection for people against accidents.

The invention solves the problem by a helicopter of this generic type which has a collision avoidance apparatus, which is designed to prevent a person from colliding with the tail boom.

Furthermore, the invention solves the problem by a method having the steps (a) automatic detection of a distance between the tail boom and an object which is present approximately in the vicinity of the tail boom, and (b) outputting a warning signal, which can be perceived in the vicinity of the tail boom, and/or stopping of the tail rotor, if the distance is less than a predetermined minimum distance.

The invention has the advantage that the proximity sensor makes it possible to use simple means to identify that people or other objects are coming into dangerous proximity with the tail rotor. For example, it is then possible to output a warning to the person.

A further advantage is that people approaching the tail rotor can be warned without any need, for example, to permanently illuminate the tail rotor. By way of example, such illumination should be avoided for military applications.

A further advantage is that existent helicopters can easily be retrofitted, by providing sensors and an appropriate evaluation unit on the helicopter.

For the purposes of the present description, the proximity sensor means, in particular, a sensor which determines the distance to an object which is present in a sensor direction. The sensor direction could also be referred to as a sensor cone, and refers to the totality of those directions within which an object may appear relative to the sensor in such a way that the sensor perceives the object.

A collision avoidance apparatus means, in particular, any apparatus which is designed and configured to prevent someone colliding with the tail boom, in particular the tail rotor. The tail rotor is part of the tail boom.

According to one preferred embodiment, the helicopter has a second proximity sensor and at least one third proximity sensor, with at least two of the proximity sensors differing with respect to their range, their resolution, their sensor direction and/or their sensor principle. It is particularly advantageous to provide and thus arrange a sufficient number of proximity sensors such that any object which is within a predetermined minimum distance of the tail boom is detected by at least one of the sensors. This ensures that potential hazards of the object or caused by the object are reliably identified.

A tail rotor is preferably attached to the tail boom, with at least one proximity sensor being fitted at the center of rotation of the tail rotor. This makes it possible to particularly safely monitor the area around the tail rotor, which represents a particularly major hazard to people and is at the same time particularly at risk. Two proximity sensors are particularly preferably provided, monitoring the area around the tail rotor in opposite directions.

According to the invention, an electrical evaluation unit is provided, which is connected to the proximity sensors and is designed to calculate a position of the object relative to the helicopter. By way of example, the position of the object relative to the helicopter can be determined by triangulation, and indicates the distance to and the direction from the helicopter. This measurement principle is based on using the distance values which are detected by two different sensors to calculate the distance relative to the two sensors. Alternatively, or additionally, it is possible for the proximity sensors to be angle-selective.

The evaluation unit is particularly preferably designed to calculate a speed of the object relative to the helicopter. The evaluation unit can then additionally be designed in order to calculate a trajectory of the object relative to the tail boom and to extrapolate this into the future. For example, if someone is moving toward the tail rotor, then this person can be warned in good time that he or she is in this case entering a hazard area.

According to one preferred embodiment, the evaluation unit is therefore designed to compare the at least one position of the object with a protection area around the helicopter, and/or to extrapolate a trajectory of the object from the position of the object and its speed and to output a signal when the object is in a protection area around the helicopter, and/or will be located there within a predetermined time interval. For example, the signal can be a warning signal which is emitted in audible, visual, tactile or some other manner in the vicinity of the tail boom.

It is advantageous for the evaluation unit to be designed to stop the tail rotor if the object is within a minimum distance of the tail rotor. In this case, the evaluation unit is designed to check whether the helicopter is on the ground, such that the torque of the main rotor can be coped even without the tail rotor. If it is found that the torque of the main rotor cannot be coped with, then the evaluation unit is designed to shut down the main rotor.

In order to prevent damage to the tail boom on landing, one preferred embodiment provides that at least one proximity sensor has a sensor direction downward, and the evaluation unit is designed to output a signal if a longitudinal attitude angle of the helicopter would lead to an impact with the tail boom. A signal such as this can be either a signal which can be perceived by a person, for example a visual, tactile or audible signal, or can lead to a control unit in the helicopter being operated such that the longitudinal attitude angle of the helicopter is changed so as to prevent impact with the tail.

In order to reduce damage when it has not been possible to prevent a collision with the tail rotor, one preferred embodiment provides for the evaluation unit to be designed to determine whether the object has collided with the tail rotor, to detect whether the tail rotor has been so severely damaged that an emergency landing is necessary, and to initiate autorotation of the helicopter if this is the case.

The invention will be explained in more detail in the following text with reference to the attached figures, in which.

Figure 1:
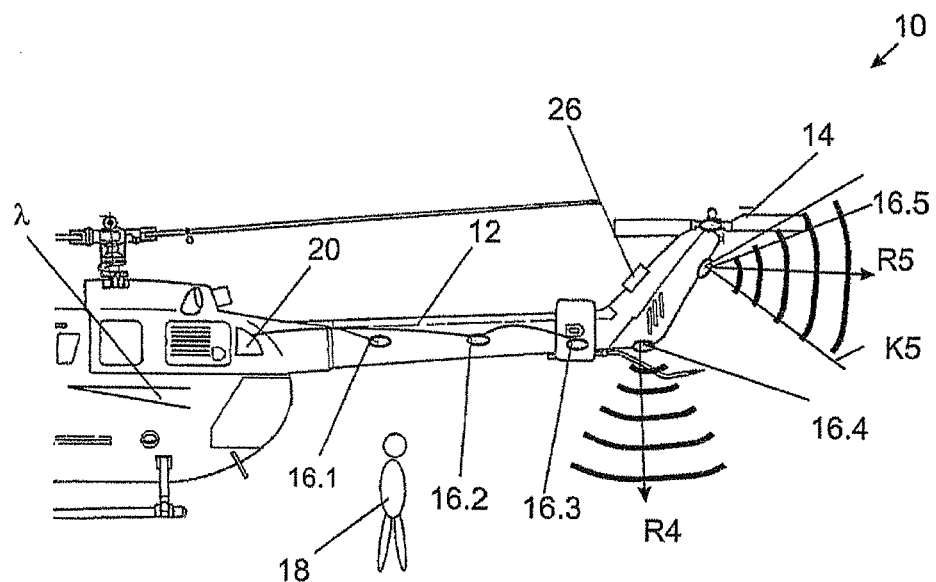
FIG. 1 shows a schematic view of a helicopter according to the invention.

FIG. 1 shows a helicopter 10 according to the invention with a tail boom 12 to which a tail rotor 14 is attached. Proximity sensors 16.1, 16.2, ... are fitted to the tail boom 12. In the following text, reference symbols without a numerical suffix in each case denote the object as such.

Each proximity sensor 16 has a sensor direction R which forms a center line through a sensor cone K. For example, the proximity sensor 16.5 has the sensor cone K5 and the sensor direction R5.

The proximity sensors 16 may, for example, be laser sensors, ultrasound sensors and/or radar sensors. They are designed to detect an object 18, for example a person or a tree, in the vicinity of a tail boom 12, and its distance A from the respective proximity sensor. For example, the proximity sensor 16.1 is designed to detect the distance A1 of the object 18 from the proximity sensor 16.1, while the proximity sensor 16.2 measures the distance A2 from the object 18.

The proximity sensors 16 are connected to a schematically indicated evaluation unit 20 which detects the distances A. In order to produce a particularly detailed image, at least two of the proximity sensors 16 differ in terms of their range, their resolution or their principle of operation.

The proximity sensor 16.4 is designed to detect a distance A4 between the tail boom 12 and the ground. It is therefore possible to detect when there is a threat of the tail boom 12 colliding with the ground. During the landing approach, the pilots frequently approach with high longitudinal attitude angles λ, as a result of which the nose of the helicopter 10 is pulled upward, thus decelerating the helicopter 10. During the process, however, the tail boom 12 moves downward, and can make contact with the ground during extreme landing maneuvers. Damage to the tail boom possibly resulting from this is prevented with the aid of the proximity sensor 16.4.

Figure 2:
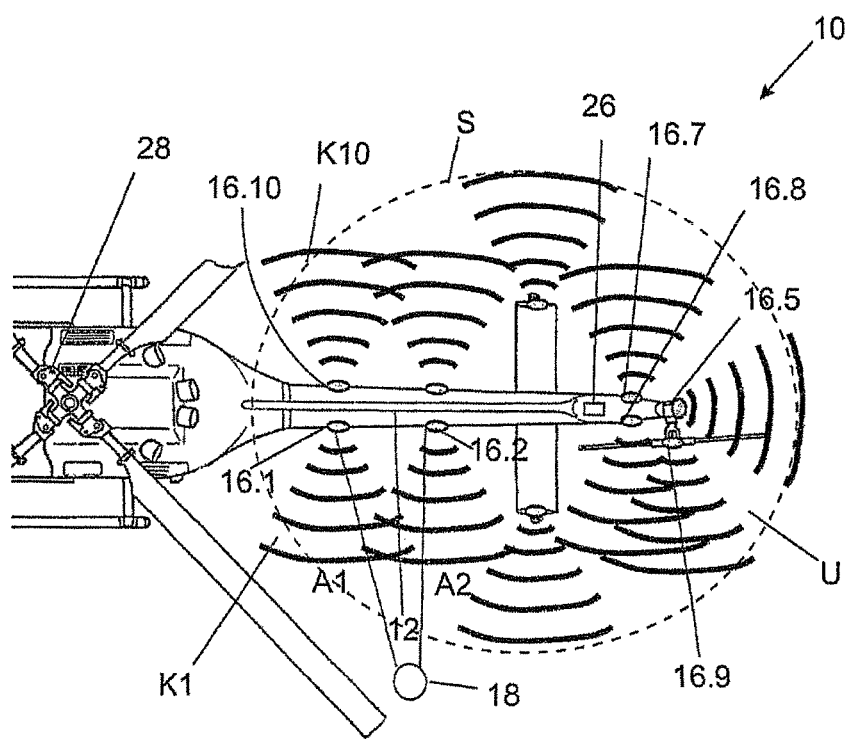
FIG. 2 shows a view from above of a helicopter according to the invention.

FIG. 2 shows a helicopter according to the invention with the proximity sensors 16.1, ..., 16.9, although FIG. 2 does not show the proximity sensor 16.4 which acts downward. As can be seen, the sensor cones K1, ... K10 are superimposed, thus monitoring a protection area S in the vicinity U of the tail boom 12 without any gaps.

FIG. 2 furthermore shows that the proximity sensor 16.9 is arranged at the center of rotation of the tail rotor 14. This means that the proximity sensor 16.9 is not influenced by the rotating tail rotor 14. In contrast, the sensor 16.8 detects the rotor blades of the tail rotor 14 moving past at regular short intervals. The evaluation unit 20 is therefore designed to filter out the signals caused by the tail rotor.

Figure 3:
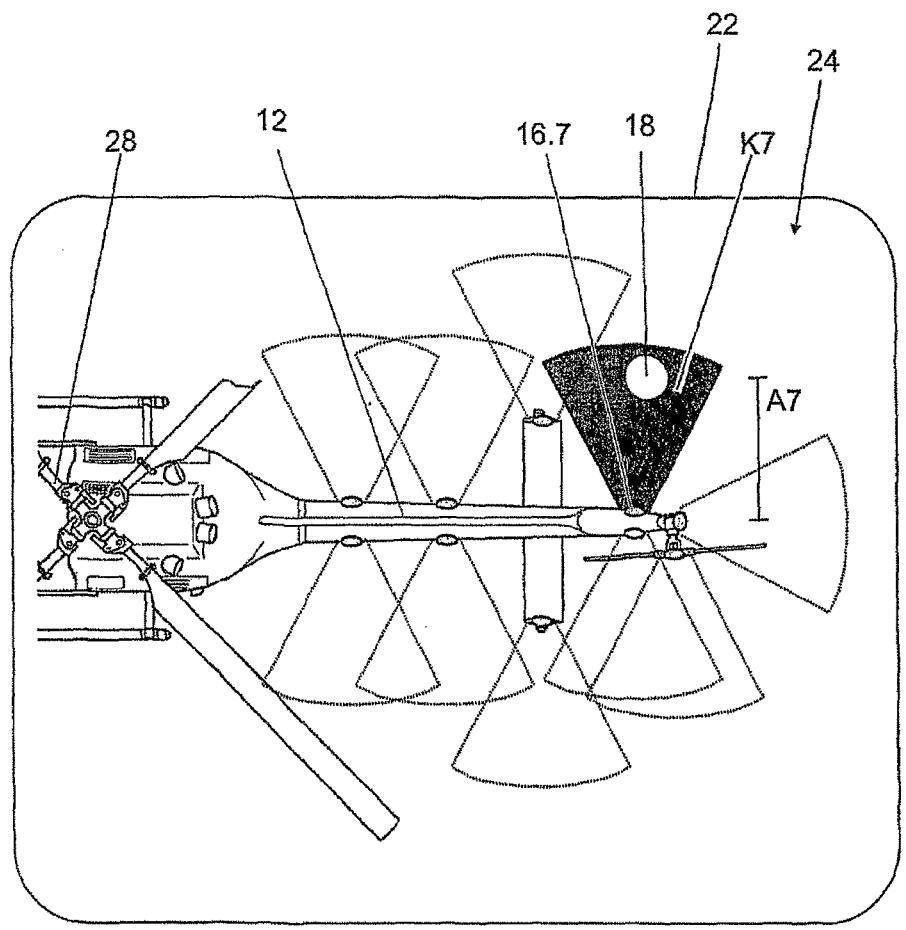
FIG. 3 shows a schematic view of a chart for displaying in a cockpit of the helicopter.

FIG. 3 schematically shows a display appliance 22 in the cockpit of the helicopter, on which a chart 24 of the area surrounding the tail boom 12 is shown. This chart 24 is generated by the evaluation unit from the data from the proximity sensors. In the situation illustrated in FIG. 3, the proximity sensor 16.7 has detected the object 18 at a distance A7 which is less than a predetermined alarm distance $A_{Alarm}$. For this reason, an area which represents the sensor cone K7 is colored red, as a result of which a pilot of the helicopter can immediately identify that there is a risk threat.

Furthermore, the pilot warning may be audible, tactile or combined. In addition, it is possible to output a warning via a loudspeaker 26 (FIG. 2).

The proximity sensors 16 continuously determine the position of the object 18 by triangulation. A relative speed v of the object 18 relative to the tail boom 12 is calculated by interpolation from the individual position measurements relative to the tail boom 12. The movement trajectory in the past is extrapolated into the future to determine whether the predetermined safe separation distance from the tail rotor 14, for example, will or will not be undershot. If so, as described above, a warning is output to the pilot via the chart 24, and to any person via the loudspeaker 26.

A graduated information and warning strategy can be pursued in this way, in which the pilot is first of all warned of a risk, after which it is possible to output the warning signal via the loudspeaker 26 and, furthermore, after this, the evaluation unit 20 can output a signal to an on-board computer in the helicopter 10, which automatically carries out an escape flight maneuver. In this case, it is possible to provide for a pilot assistance system designed in this way to take over control of the helicopter with restricted authority, in order to prevent a collision with objects in flight.

If the pilot or the system described above cannot manage to avoid colliding with the object, and the tail rotor 14 is damaged in a collision, then a further automatic system can identify the collision of the tail rotor with the object in flight, and can assess the damage to the tail rotor 14. If it is found that the tail rotor 14 is no longer serviceable, then the automatic system can initiate the autorotation of the helicopter, or some other suitable maneuver in order to land the helicopter more safely.

If the helicopter 10 is on the ground with the main rotor 28 rotating, an accident by contact with the tail rotor 14 can be prevented by first of all, as described above, emitting a warning sound via the loudspeaker 26, if an object 18, for example a person, is approaching the rotating tail rotor 14 and the safe separation distance has in this case been undershot. If the person approaches closer to the tail rotor 14, then the tail rotor 14 is stopped abruptly by the evaluation unit 20, mechanically or in some other way, if a critical minimum distance is undershot. The loss of the tail rotor 14 and the loss of the torque equalization resulting from this cannot result in any critical rotational movement of the helicopter provided that the main rotor torque is not high. Otherwise, the helicopter engine is automatically also shut down by the evaluation unit 20.

LIST OF REFERENCE SYMBOLS

10 Helicopter
12 Tail boom
14 Tail rotor
16 Proximity sensor
18 Object
20 Evaluation unit
22 Display appliance
24 Chart
26 Loudspeaker
28 Main motor
R Sensor direction
K Sensor cone
A Distance
U Surrounding area
$A_{Alarm}$ Alarm distance
v Relative speed
S Protection area
λ Longitudinal attitude angle

The invention claimed is:

1. A helicopter having
   (a) a tail boom,
   (b) at least one proximity sensor which is fitted to the tail boom, for detection of a distance to an object which is present approximately in the vicinity of the tail boom, and
   (c) an electrical evaluation unit, which is connected to the proximity sensors and is designed to calculate a position of the object relative to the helicopter,
   (d) the helicopter having a collision avoidance apparatus, which is designed to prevent a person from colliding with the tail boom,
   (e) wherein said evaluation unit is designed to stop the tail rotor when the object is within a predetermined minimum distance of the tail rotor, and to check whether the helicopter is on the ground and to shut down the main rotor if the torque of the main rotor is high enough to cause rotational movement of the helicopter.

2. The helicopter as claimed in claim 1, wherein that the collision avoidance apparatus is a warning apparatus for emission of a warning signal which can be perceived in the vicinity of the tail boom.

3. The helicopter as claimed in claim 1 the helicopter having
   (i) a second proximity sensor and
   (ii) at least one third proximity sensor,
   (iii) with at least two of the proximity sensors differing with respect to their range, their resolution, their sensor direction and/or their sensor principle.

4. The helicopter as claimed in claim 1, wherein
   a tail rotor is attached to the tail boom,
   with at least one proximity sensor being fitted at the center of rotation of the tail rotor.

5. The helicopter as claimed in claim 1, wherein the evaluation unit is designed to calculate a speed of the object relative to the helicopter.

6. The helicopter as claimed in claim 1, wherein the evaluation unit is designed
   to compare the at least one position of the object with a protection area around the helicopter, and/or to extrapolate a trajectory of the object from the position of the object and its speed and
   to output a signal when the object is in a protection area around the helicopter, and/or will be located there within a predetermined time interval.

7. The helicopter as claimed in claim 6, wherein the evaluation unit is designed
   to display the objects which are present in the vicinity on a chart of the area around the tail boom and,
   to display the chart by means of a display appliance in a cockpit of the helicopter.

8. The helicopter as claimed in claim 1, wherein
   at least one proximity sensor has a sensor direction downward, and
   the evaluation unit is designed to output a signal if a longitudinal attitude angle of the helicopter would lead to an impact with the tail boom.

9. A method for operation of a helicopter having a tail boom, having the following steps:
   (a) automatic detection of a distance between the tail boom and an object which is present approximately in the vicinity of the tail boom,
   (b) outputting a warning signal, which can be perceived in the vicinity of the tail boom,
   (c) stopping the tail rotor if the distance is less than a predetermined minimum distance, and
   (d) checking whether the helicopter is on the ground and shutting down the main rotor if the helicopter is on the ground and the torque of the main rotor is high enough to cause rotational movement of the helicopter.

* * * * *